US005512097A

United States Patent [19]

Emmer

[11] Patent Number: 5,512,097
[45] Date of Patent: Apr. 30, 1996

[54] REMOVAL OF SULFUR OXIDES FROM WASTE GASES BY SCRUBBING WITH AN AQUEOUS SLURRY OF FINELY COMMINUTED LIMESTONE

[76] Inventor: Wayne W. Emmer, 7921 Kerrybrooke Trail, Poland, Ohio 44514

[21] Appl. No.: 350,535

[22] Filed: Dec. 7, 1994

Related U.S. Application Data

[63] Continuation of Ser. No. 225,962, Apr. 8, 1994, abandoned.

[51] Int. Cl.$^6$ .............................. C04B 2/10; C01B 17/22
[52] U.S. Cl. ..................... 106/745; 106/757; 106/765; 423/243.08; 423/244.07; 423/244.08
[58] Field of Search .................... 423/243.08, 244.07, 423/244.08; 106/745, 752, 757, 765, 771

[56] References Cited

U.S. PATENT DOCUMENTS

| | | | |
|---|---|---|---|
| 3,803,805 | 4/1974 | Low | 55/73 |
| 4,102,982 | 7/1978 | Weir | 423/242 |
| 4,301,127 | 11/1981 | Goodstine | 423/242 |
| 4,374,813 | 2/1983 | Chen et al. | 423/242 |
| 4,576,803 | 3/1986 | Hegemann et al. | 423/242 |

OTHER PUBLICATIONS

Hamm, H., et al., "The Two-stage Knauf-Research-Cottrell Process for Flue Gas Desulphurization as Exemplified by the Franken Power Station", *Zem.-Kalk-Gips* (ZKG), Ed.B (1982), vol. 35(6), pp. 313–317. (no month).

*Primary Examiner*—Gary P. Straub
*Assistant Examiner*—Thomas G. Dunn, Jr.
*Attorney, Agent, or Firm*—Vorys, Sater, Seymour, and Pease

[57] ABSTRACT

Acidic gases such as sulfur oxides are removed from a waste gas stream by passing it through a reverse jet scrubber in which a suspension of finely divided limestone is used as an absorption medium. The method is particularly adaptable for use in a cement manufacturing plant wherein the sulfur dioxides in the waste gases from the combustion of fossil fuels used for process heat are removed by passing them through a reverse jet scrubber that uses as an absorption medium a suspension of finely divided limestone derived from the powdered limestone feed to the cement-making process and wherein the calcium sulfate slurry formed by reaction of the sulfur oxides with the calcium carbonate in the absorption medium is returned to the limestone comminution step of the cement making process and thereby disposed of as an ingredient of the cement clinker.

4 Claims, 2 Drawing Sheets

REMOVAL OF SULFUR OXIDES FROM WASTE GASES BY SCRUBBING WITH AN AQUEOUS SLURRY OF FINELY COMMINUTED LIMESTONE

This application is a Continuation of Ser. No. 08/225,962, filed Apr. 8, 1994, now abandoned.

BACKGROUND OF THE INVENTION

1. Field of the Invention

This invention relates to methods of treating waste gases to remove sulfur oxides and more particularly to removing sulfur oxides from waste gases by scrubbing using a reactive absorbent. The invention also relates to improved methods of removing sulfur oxides from waste gases generated in the manufacture of portland cement.

2. Brief Description of the Prior Art

Sulfur oxides are ubiquitous contaminants in waste gases from industrial processes. They are produced in the combustion of fossil fuels, especially coal and oil, which is the source of process heat for most industrial activity. Because these gaseous oxides are notorious constituents of air pollution and contribute substantially to the formation of acid rain, the emission of sulfur oxides, i.e., sulfur dioxide ($SO_2$) and sulfur trioxide ($SO_3$), is strictly regulated, and the restrictions on such emissions are expected to become more stringent in the future.

Because of the importance of removing sulfur oxides from industrial waste gases, a wide variety of techniques has been developed to treat such waste gases to reduce or eliminate the emission of sulfur oxides. Among such techniques are those employing adsorption, chemical reaction, condensation, and absorption.

Absorption techniques typically involve contacting the waste gas stream with a liquid in which the gas to be removed is soluble or with which it reacts to form a dissolved solute or a precipitate. The continuous phase in such a contact arrangement may be the gas or the liquid. In absorption of acidic gases such as sulfur oxides it is conventional to use an alkaline liquid as the absorbent. Among the alkaline agents used in absorption liquids for sulfur oxides in waste gas streams are soluble alkalis such as sodium hydroxide and calcium hydroxide. Often the calcium hydroxide is provided by slurrying lime (calcium oxide) with water.

In most conventional types of scrubbing apparatus a stream of waste gas containing sulfur oxides is contacted with an alkaline absorbing liquid in co-current or countercurrent fashion. In order to enhance the surface area of contact between the liquid and the gas, the liquid may be sprayed into the gas stream or trickled over a bed of packing. Both cocurrent and countercurrent contacting arrangements are used.

One well-developed gas scrubbing apparatus for providing intimate contact between a waste gas and a scrubbing liquid is the reverse jet scrubber disclosed in U.S. Pat. No. 3,803,805, to Low. In such apparatus, waste gas is passed through a conduit at a relatively high velocity while a jet of scrubbing liquid is directed countercurrently and generally coaxially to the flow of gas. The gas velocity is sufficiently high so that the jet is turned back and carried along with the gas stream to subsequent processing operations. The intimate mixture of forward flowing waste gas and reverse jet liquid stream produces a froth zone in the conduit which is conducive to intimate contact between the waste gas and the scrubbing liquid. This intimate mixing assures a thorough wetting of particles in the waste gas stream so that they may be easily collected downstream and is also conducive to absorption of gases in the waste stream into the scrubbing liquid. In particular, acidic gases such as sulfur oxides can be absorbed in a reverse jet spray, especially if the liquid contains an alkaline agent to react with the acidic gas. However, the only alkaline agent exemplified in the Low patent for removal of sulfur dioxide is sodium hydroxide in dilute aqueous solution. U.S. Pat. No. 3,803,805 does not disclose the use of limestone in a reverse jet absorption system.

U.S. Pat. No. 4,102,982, to Weir, discloses a process for removing pollutants such as sulfur dioxide from stack gases by passing the waste gases through a substantially horizontal conduit while spraying a scrubbing liquid transverse to the flow of gas. For removing acidic pollutants such as sulfur dioxide a scrubbing solution containing lime may be used. Weir discloses that the use of limestone in conventional wet scrubbers for removing sulfur dioxide from waste gases has resulted in a lower efficiency of removal.

U.S. Pat. No. 4,374,813, to Chen, discloses an improved reverse jet scrubber for removing acidic pollutants form waste gases. However, Chen discloses only the use of a caustic solution as the scrubbing liquid.

U.S. Pat. No. 4,576,803, to Hegemann et al., discloses scrubbing flue gases with scrubbing solutions containing lime which may include calcium carbonate as well. However, Hegemann does not disclose maintaining a high efficiency in scrubbing flue gases with scrubbing solutions containing limestone.

Hamm, H., et al., "The Two-stage Knauf-Research-Cottrell Process for Flue Gas Desulphurization as Exemplified by the Franken Power Station", Zem.-Kalk-Gips (ZKG), Ed. B (1982), Vol. 35(6), pp. 313–317, discloses scrubbing flue gas from a coal-fired power station with a slurry of finely divided limestone (particle size less than 90 micrometers) in a relatively complex two-stage countercurrent spray tower. The process disclosed in this reference achieves removal of about 90% of the sulfur dioxide in the flue gas.

Thus, the prior art has not considered limestone to be an efficient material for absorbing sulfur dioxide from waste gases, although it has been used in some cases for economic reasons in spite of its low efficiency.

Accordingly a need has continued to exist for a simple method of removing sulfur oxides from a waste gas stream that exhibits high efficiency with the use of economical absorbents.

SUMMARY OF THE INVENTION

This problem has now been solved by a process in which acidic gases such as sulfur oxides are removed from a waste gas stream by passing it through a reverse jet scrubber in which a suspension of finely divided limestone is used as an absorption medium.

The method is particularly adaptable for use in a cement manufacturing plant wherein the sulfur oxides present in the waste gases from the combustion of sulfur-containing fossil fuels used for process heat or from sulfur present in the cement feedstock, e.g., in the form of pyrites, are removed by passing the gases through a reverse jet scrubber that uses as an absorption medium a suspension of finely divided limestone derived from the powdered limestone feed to the cement-making process and wherein the calcium sulfate slurry formed by reaction of the sulfur oxides with the calcium carbonate in the absorption medium is returned to the limestone comminution step of the cement making process and thereby disposed of as an ingredient of the cement clinker.

Accordingly it is an object of the invention to provide a process for absorbing acidic gases from a stream of waste gas.

A further object is to provide a process for absorbing sulfur oxides from a waste gas stream.

A further object is to provide an efficient process for removing acidic gases from a waste gas stream using an economical absorbent.

A further object is to provide a method of absorbing acidic gases from a waste gas stream that uses a limestone slurry as an absorbent.

A further object is to provide method of removing acidic gases from a waste gas stream generated in the operation of a cement manufacturing plant that uses a limestone slurry as an absorbent medium and disposes of the solid waste in the cement clinker.

Other objects of the invention will become apparent from the description of the invention which follows.

DETAILED DESCRIPTION OF THE INVENTION AND PREFERRED EMBODIMENTS

It has now been found that a reverse jet scrubber of the type disclosed in U.S. Pat. No. 3,803,805 may be operated using a slurry of finely divided limestone as the absorbing medium, and that the absorption of the acidic gases in such a process is very efficient.

In reverse jet scrubbers of the type disclosed in U.S. Pat. No. 3,803,805 the waste gas stream is directed through a conduit at a relatively high velocity, at least 1000 feet per second, and the scrubbing liquid is directed countercurrently to the gas flow through a jet located centrally in the conduit. The gas and liquid mix to form a froth zone located within the conduit before the gas reaches the location of the jet. In the froth zone an intimate mixture of gas and liquid takes place whereby dust particles are taken up in the liquid and soluble or reactive gases can be taken up into the liquid phase. The gas flow then continues past the jet, entraining droplets of the scrubbing liquid. The gas flow with entrained droplets then enters a liquid disengagement chamber in which the liquid droplets coalesce and fall to the bottom, while the scrubbed gas passes out of the chamber for exhaust or further processing.

Such reverse jet scrubbers have been used in many applications for removing particles and pollutant gases from waste gas streams. However, the use of such scrubbers using a limestone slurry for removal of sulfur oxides has not been reported.

Figure 1:
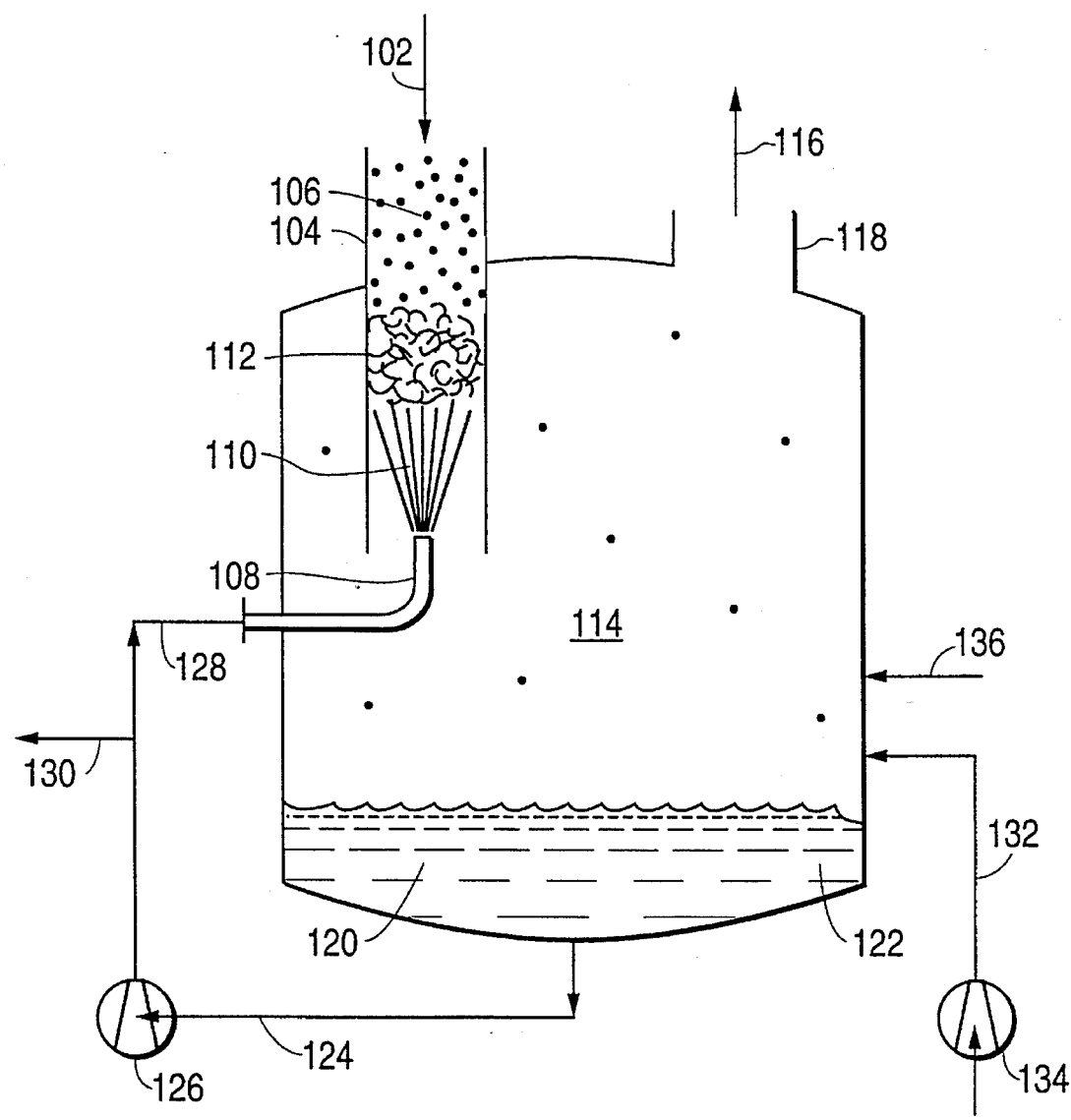
FIG. 1 illustrates a preferred apparatus for carrying out the process of the invention.

FIG. 1 illustrates a typical installation of a reverse jet scrubbing apparatus using the process of this invention A stream of waste gas 102 containing sulfur oxides enters a gas conduit 104 in a generally vertically downward direction. A liquid discharge pipe 106 located generally centrally in conduit 104 discharges a jet 110 of an aqueous slurry of calcium carbonate in a direction countercurrent to the flow of gas 102 in conduit 104. The jet of liquid 110 interacts with the gas stream 102 to form a froth zone 112 which fills the entire cross section of the conduit 102 and may move up and down therein according to the relative momenta of the gas stream 102 and the liquid jet 110. The intimate mixture of gas and scrubbing liquid results in very efficient gas-liquid contact and the absorption of a high percentage of the sulfur dioxide as well as scrubbing of the particulate matter from the gas stream. The stream of gas and liquid then enters a liquid disengagement chamber 114 in which the velocity of the gas stream is much less because of the large cross-section of the chamber through which the gas flows. The liquid droplets containing the particulate matter and the sulfur oxides settle to the sump zone 122 of the disengagement chamber 114 where the scrubbing slurry 120 collects. The clean gas stream 116 exits the disengagement chamber 114 through the outlet 118 for exhaust to the atmosphere or further processing as necessary.

The scrubbing liquid slurry 120 initially comprises a slurry or suspension of finely ground limestone in water. The slurry is withdrawn from the sump 122 of the disengagement chamber 114 through a recirculation drain line 124. The withdrawn slurry is pumped by the recirculation pump 126 through the scrubbing liquid feed line 128 to the scrubbing liquid discharge pipe 108. As the scrubbing liquid is recirculated the reaction products of the limestone and the sulfur dioxide accumulate in the slurry 120 in the sump zone 122. The sulfur from the sulfur dioxide is present in the slurry in the form of a precipitate of calcium sulfite and calcium sulfate. When the amount of calcium precipitates reaches an appropriate concentration, some of the scrubbing solution 120 is withdrawn from the sump 122 via the scrubbing liquid bleed line 130. The scrubbing solution so withdrawn can be processed to recover calcium sulfate as commercially valuable gypsum, or may be disposed of by returning it to the limestone grinding stage of the cement manufacturing process.

As the sulfate/sulfite saturated scrubbing solution is bled through the bleed line 130, makeup scrubbing solution comprising a slurry of finely ground limestone in water is pumped by the feed pump 134 through the limestone slurry feed line 132 into the sump 122 of the disengagement chamber 114. Because the scrubbed gas may carry with it relatively large amounts of water as vapor, provision is made for adding make-up water to the disengagement chamber 114 through the water feed line 136.

It is preferred that the limestone used in the scrubbing slurry according to this invention be very finely ground. Although no absolute limits can be placed on the particle size, the use of finer particles has a number of advantages. The use of finer particles will improve the efficiency of the scrubbing process because for a given mass of limestone the surface area available for reaction will increase inversely as the square of the particle size which will provide a greater ratio of surface to mass and a proportionately greater rate of reaction. Because the particles spend a finite time in the reaction zone, this greater reaction rate of the finer particles may permit the use of a lower mass flow rate of limestone to achieve a desired scrubbing effect. The smaller particles will also produce less abrasive wear on the nozzle of the liquid jet. Finally, the smaller particles have less tendency to settle out of the aqueous suspension, which makes the slurry easier to handle. Consequently, although limestone particles having a size less than 50 mesh ((−) 50 mesh, less than 297 micrometers) can be used in the process of the invention, it is preferred, for efficient scrubbing, that at least 80% of the particles, more preferably at least 90%, should have a particle size of less than 200 mesh (less than 77 micrometers). Such limestone is typically available from the limestone grinding mill of a cement manufacturing plant. If more finely ground limestone is available it can be used to advantage. For example, a material having a particle size of 80% less than 500 mesh would be expected to be especially advantageous, although the use of such particles might not always be practical because it is difficult to grind limestone to such a fine particle size consistently in an industrial operation.

The ratio of solids to liquid in the limestone particle suspension is preferably about 20% by weight. Although other ratios can be used, a greater proportion of solids makes for a heavier slurry that is harder to handle, while a smaller proportion of solids requires a greater flow rate in order to expose the gas to a given amount of limestone.

The flow rate of limestone slurry to be used in treating a particular waste gas is determined by first determining the amount of sulfur oxides that have to be removed from the gas in a given period of time. The stoichiometric amount of limestone is then calculated using the known proportion of calcium carbonate in the limestone. The actual amount of limestone to be used in the given time is estimated by multiplying the stoichiometric amount by a factor of 5 to 10 to allow for slow rates of reaction, unavailability of the limestone in the interior of the particles for reaction and the like. The water flow rate is then calculated to give the preferred solid/liquid ratio of about 20% by weight.

It has been found that, surprisingly, when waste gases containing sulfur oxides are contacted with an aqueous slurry of finely ground limestone in a simple reverse jet scrubber, over 90% of the sulfur oxides are removed from the waste gas.

In a preferred embodiment of the process of the invention, the limestone for the scrubbing slurry is derived from the stream of finely ground limestone that is used as one ingredient for the manufacture of portland cement. According to this preferred embodiment the spent scrubbing slurry, i.e., the slurry having a relatively large proportion of calcium sulfate/sulfite is returned to the limestone grinding step of the cement manufacturing process. The gypsum in the slurry provides at least a part of the gypsum that is normally added to portland cement. In this way the sulfur oxides from the flue gases are incorporated into the cement as the desirable additive gypsum rather than being released as an atmospheric pollutant. Furthermore, the use of the spent scrubbing slurry in the manufacture of cement obviates the need to dispose of it elsewhere.

Figure 2:
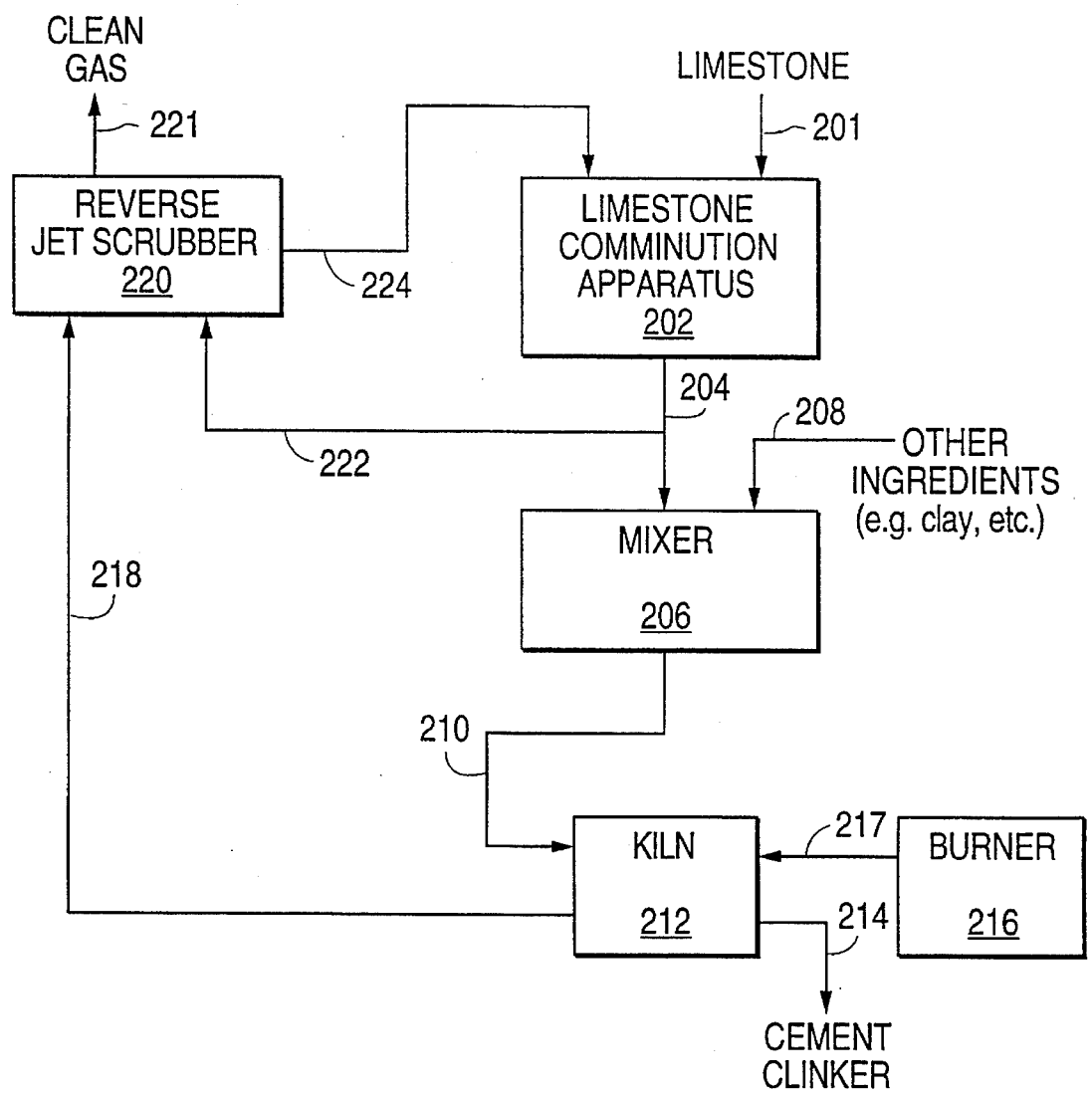
FIG. 2 is a flow diagram illustrating the operation of a cement manufacturing plant using the process of the invention.

The process of the invention used in the operation of a cement plant is illustrated in FIG. 2.

The operation of the generally conventional portland cement plant is illustrated schematically. The principal ingredients for making conventional portland cement comprise sources of the oxides of calcium, silicon, aluminum and iron. Commonly these oxides are supplied by limestone and clay, with additional ingredients such as shale and/or iron ore to achieve the desired proportions. The raw materials are finely comminuted by crushing and grinding, then mixed, and calcined to partial fusion in a rotary kiln. The partially fused material is cooled to form cement clinker which is then finely ground to form portland cement of commerce.

FIG. 2 is a schematic representation of the process of the invention for integrating the scrubbing process into a conventional cement-making process. A stream of limestone 201 is fed to limestone comminution apparatus 202 wherein it is finely ground, preferably to a particle size of less than 200 mesh (−200 mesh). This comminution apparatus 202 may comprise one or more stages of crushing and grinding including crushing rolls and/or a grinding mill. A stream 204 of ground limestone is sent to a mixer 206 wherein it is blended with a stream 208 of finely ground clay and/or other materials. A stream 210 of the mixed cement ingredients is sent to a cement kiln 212 wherein it is heated to a temperature high enough to produce the chemical reactions between the ingredients. The product then leaves the kiln at 214 and is cooled to form the cement clinker.

The mixture in the kiln is heated by direct contact with a stream of hot gases 217 produced by a burner 216 fired by pulverized coal, oil or combustible gas located at the discharge end of the kiln. The hot gases leaving the input end of the kiln 212 in a stream 218 are led to the waste gas scrubber 220, which is preferably a scrubber of the reverse jet type as described above. The stream of clean gas 221 leaves the scrubber and may be exhausted to the atmosphere or given additional treatment. A stream of finely ground limestone 222 is drawn off from the stream of limestone 204 from the limestone comminution apparatus 202 and is directed to the waste gas scrubber. The stream of gypsum slurry 224 from the waste gas scrubber 220 is returned to the limestone comminution apparatus 204 where it mixes with the incoming limestone and is for the most part incorporated into the cement.

The following example is intended to illustrate the invention and is not to be considered as limiting its scope.

EXAMPLE

In a pilot plant experiment, a gas stream taken from the kiln of a cement manufacturing plant and containing about 200 to about 420 parts per million (ppm) of $SO_2$ was treated according to the process of the invention. The gas stream was passed through a single-stage reverse jet scrubber, then through a disengagement chamber wherein a slurry of scrubbing liquid was held in a sump. The scrubbing liquid comprised a slurry of limestone having a composition of about 75% calcium carbonate and ground to a particle size of 90% less than 200 mesh. The waste gas stream was passed through the reverse jet scrubber at a rate of 375 ACFM (after quenching). The reverse jet was operated at a liquid/gas ratio of 40–53 gallons per minute of scrubbing liquid per 1000 ACFM of waste gas and a nozzle pressure of 15020 pounds per square inch gage. It was found that >90% of the $SO_2$ was removed from the gas.

The invention having now been fully described, it should be understood that it may be embodied in other specific forms or variations without departing form its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

I claim:

1. In a process for making portland cement wherein limestone is finely comminuted in a limestone comminution step and mixed with a siliceous material to form a feed mixture, and said mixture is fed to a kiln and heated therein by contact with hot combustion gases containing sulfur oxides to form cement clinker, the improvement comprising:

forming an aqueous suspension of a portion of said finely comminuted limestone;

feeding said limestone suspension directly to a liquid disengagement chamber of a reverse jet scrubber for removing sulfur oxides from a waste gas stream;

recirculating said slurry from said chamber directly through said reverse jet scrubber, reacting sulfur dioxides in said reverse jet scrubber with said limestone to form a slurry containing calcium sulfite and calcium sulfate in said liquid disengagement chamber;

withdrawing said slurry containing calcium sulfite and calcium sulfate from said liquid disengagement chamber and feeding said slurry directly to said limestone comminution step.

2. The improvement of claim 1 wherein said limestone is comminuted to a particle size of less than 200 mesh.

3. The improvement of claim 1 wherein said limestone is comminuted to a particle size of less than 500 mesh.

4. The process of claim 1 wherein said aqueous limestone suspension contains about 20% limestone by weight.

* * * * *

UNITED STATES PATENT AND TRADEMARK OFFICE
CERTIFICATE OF CORRECTION

PATENT NO. : 5,512,097
DATED : April 30, 1996
INVENTOR(S) : Wayne W. Emmer

It is certified that error appears in the above-indentified patent and that said Letters Patent is hereby corrected as shown below:

Title page, item [73], Assignee: should read -- ESSROC MATERIALS, INC., 430 Mountain Avenue, Murray Hill, New Jersey 07974--.

Signed and Sealed this

Seventeenth Day of December, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO.  : 5,512,097
DATED       : April 30, 1996
INVENTOR(S) : Wayne W. Emmer It is certified that error appears in the above-indentified patent and that said Letters Patent is hereby corrected as shown below:

On the cover page, following the listing of the inventor's name and address, insert the following line:

-- Assignee: ESSROC Materials, Inc., Murray Hill, New Jersey --

Signed and Sealed this

Eighteenth Day of February, 1997

Attest:

BRUCE LEHMAN

*Attesting Officer*     *Commissioner of Patents and Trademarks*